June 3, 1952 — T. T. WOODSON — 2,599,307
MOTOR AND PUMP ASSEMBLY
Original Filed Nov. 23, 1945
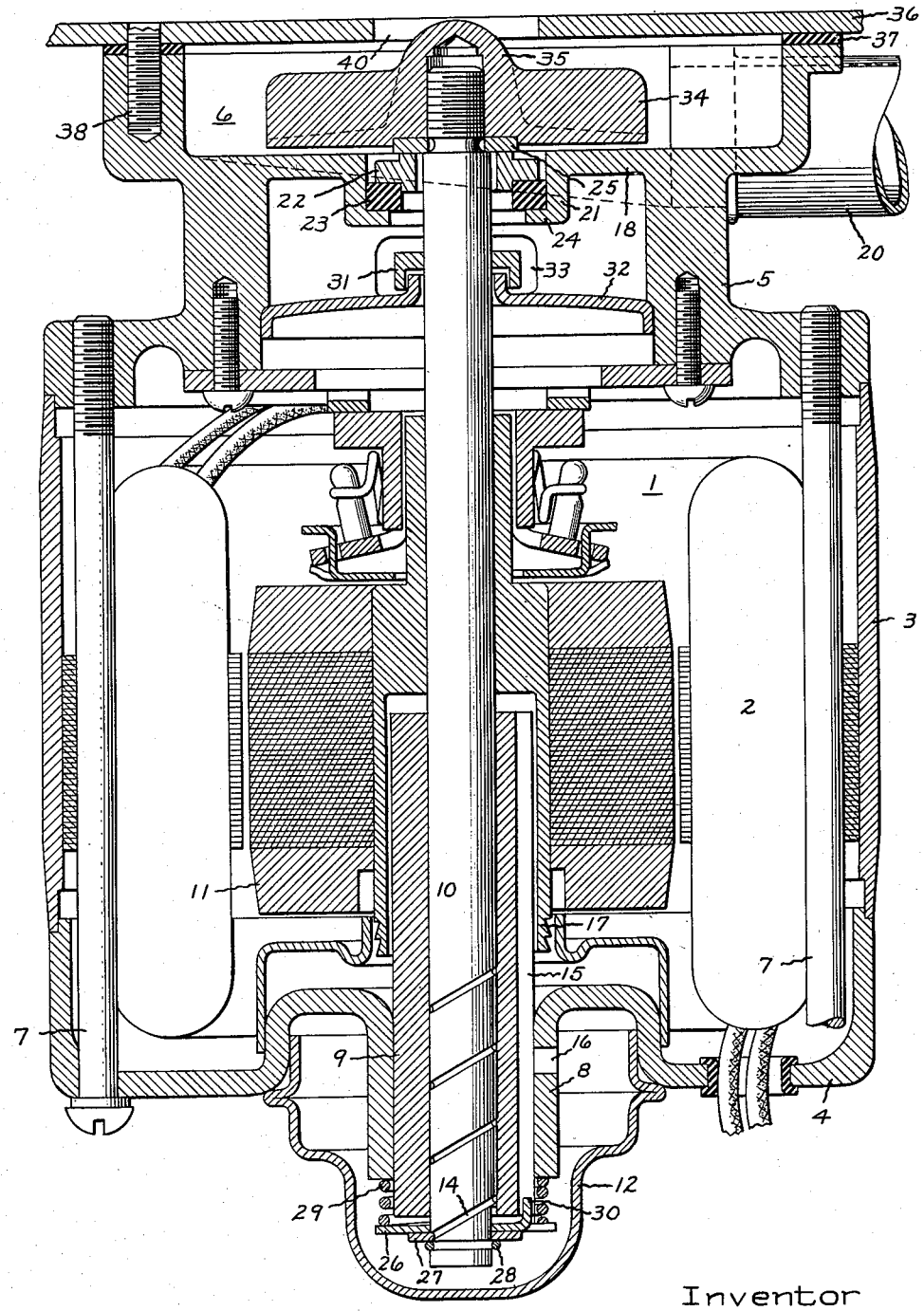
Inventor
Thomas T. Woodson
by *[signature]*
His Attorney Patented June 3, 1952

2,599,307

UNITED STATES PATENT OFFICE 2,599,307

MOTOR AND PUMP ASSEMBLY

Thomas T. Woodson, Bridgeport, Conn., assignor to General Electric Company, a corporation of New York Original application November 23, 1945, Serial No. 630,438, now Patent No. 2,526,443, dated October 17, 1950. Divided and this application July 18, 1950, Serial No. 174,425

3 Claims. (Cl. 222—383)

This application is a division of my pending application Serial No. 630,438, filed November 23, 1945, now Patent 2,526,443, for Electric Motor Driven Pump, and assigned to my present assignee.

It is an object of the invention to provide an electric motor driven impeller pump which is of small size and compact organization, and has a pump chamber adapted to be secured directly to a wall of the tank or the like from which liquid is to be pumped, the wall providing the cover plate of the pump chamber and having a drainage port cooperating with the hub of the impeller to provide an efficient pump inlet.

It is another object of the invention to provide a pump and drive motor assembly in which an element of the pump housing provides an end closure for the motor casing.

In a presently preferred embodiment of the invention a suitable structure forms the side wall and base wall of an impeller cavity. When said structure is secured to the wall of the vessel to be pumped, said wall serves as the cover for the impeller chamber. The depth of said chamber is less than the maximum hub depth of the impeller; and by suitably shaping the impeller hub and relating it to an outflow opening in the tank an efficient pump intake system may be obtained without additional parts or accessories. A drive motor with its shaft extended to carry the pump impeller affixes directly to a lower wall portion of the structure. The pump structure provides an end closure for the motor casing, thus eliminating one casing part. The arrangement of the tank, pump structure, and motor in superimposed, detachably secured relationship facilitates initial assembly thereof and any subsequent disassembly which may be required in replacing or servicing one or more of the components.

In the drawing the figure is the side elevation in section of a combined motor and pump housing embodying the invention.

Referring to the drawing, an electric motor 1 includes a field winding 2 secured in any suitable manner within a cylindrical casing 3. The lower end of said casing, as viewed in the figure, is closed by a suitable cap 4 and the opposite end of said casing affixes directly to a wall structure 5 which is a part of a pump housing 6. Bolts 7 or other suitable fastening means may be employed to detachably secure the motor housing components to said pump structure. End cap 4 is provided with a centrally disposed collar 8 in which is pressed a bearing sleeve 9 which forms the sole bearing for the motor shaft 10. The substantial length of said sleeve is apparent by its telescoping relationship with the armature 11 carried by the shaft. Cap 4 may be a low-cost, drawn steel shell; only the sleeve 9 need be formed of higher cost material such as sintered iron or other long wearing material suitable for bearings. A cup 12 is press fit within end cap 4 to provide an oil sump which may be supplied with a permanent charge of lubricating oil. The oil is pumped the length of the bearing by a spiral groove 14 as will be understood by those familiar with the art. Oil which is carried along the shaft 10 returns to the sump by way of an axial slot 15 in the outer wall portion of sleeve 9. The breather hole 16 prevents movement of oil upwardly along the slot 15 as the air in the sump expands upon heating. A conventional labrinth seal 17 guards against the loss of oil to the motor housing.

The pump housing 6 has a base wall 18 and a tangential discharge conduit 20; it will be understood that the impeller cavity provided by the housing has the conventional involute shape of centrifugal pumps. Within a neck portion 21 extending from wall 18 I provide a thrust collar 22 supported on a sealing ring 23 carried by the flange 24 at the base of the neck. The sealing ring is of rubber or other suitable elastic material suited for the liquid being pumped. It is in liquid-tight relationship with the collar 22 and the wall of neck 21. Shaft 10 extends freely through collar 22 and fixedly carries a thrust washer 25 which rides on said collar. The collar and washer are formed of suitable bearing material and serve also as a liquid seal. To maintain the washer 25 yieldably in contact with collar 22 there is provided at the lower end of shaft 10 a thrust ring 26 supported on a washer 27 which in turn is carried on the shaft 10 by suitable means such as a snap ring 28. Interposed between the ring 26 and the lower edge of the neck 8 is a coil spring 29 which urges the shaft 10 downwardly with respect to the thrust collar 22. An ear 30 projecting from ring 26 enters the slot 15 to hold the ring against rotation.

Additional protection against seepage of liquid along the motor shaft into the motor chamber is provided by a collar 31 securely fixed on shaft 10 to rotate therewith and disposed in overlapping relationship with the neck portion of a plate 32. Said plate fits tightly within the wall structure 5 in fluid-tight relation therewith. Liquid which may find its way along shaft 10 will be thrown outwardly through the one or more ports 33 in the structure 5 by centrifugal action developed by the rapidly rotating collar 31.

Impeller 34 is of any conventional design and is suitably affixed to the end of shaft 10. The said impeller has a dome-like hub 35 which, as clearly appears, projects above the upper edge wall of the impeller cavity. The motor and pump structure as a unit is placed against the underside of a wall 36 which represents a bottom or drainage wall of any chamber or receptacle containing liquid to be pumped therefrom. For example, the receptacle may comprise the tub of a clothes washing or dish washing machine. It will be understood that suitable gasket means 37 are provided to seal the engagement between the pump and the chamber wall. The pump and motor unit is detachably affixed to the chamber by any conventional means such as a suitable plurality of screws 38. The impeller hub 35 is concentric with respect to the opening 40 in the wall 36. Said wall therefore completes the pump chamber, with the opening 40 providing the inlet thereto. The domed hub 35 enters the opening 40 to cooperate with the rim thereof in providing an annular inflow passage characterized by a smoothly curving center wall area. The liquid enters the pump chamber with a minimum of disturbance. The surface contact of the liquid with the impeller hub imparts an initial rotation to the liquid as it enters the impeller housing, thus avoiding disturbances and hydraulic shock as the liquid is engaged by the impeller to be pumped through the discharge conduit 20.

It will thus be seen that I have provided a pumping unit comprising, in effect, a plurality of superimposed detachably secured together casing sections of which a wall element of each upper section complements and serves to complete its immediately lower section. Such construction provides a compact organization of relatively low cost and easy assembly.

While I have shown a particular embodiment of my invention, it will be understood, of course, that I do not wish to be limited thereto since many modifications may be made; and I therefore contemplate by the appended claims to cover any such modifications as fall within the true spirit and scope of my invention.

What I claim as new and desire to secure by Letters Patent of the United States is:

1. In combination, a receptacle having an opening in a wall thereof, a pump having a housing with one end open, means for attaching the pump housing to said receptacle wall with its open end in line with said receptacle opening, whereby such wall serves as a cover for the open end of the pump housing and said receptacle opening serves as a liquid inlet port for said pump.

2. In combination, a pump structure providing side and bottom wall portions of an impeller chamber for a liquid pump, a drive motor having a casing detachably affixed to the bottom wall portion of said structure, motor shaft means extending into said impeller chamber, an impeller on said shaft, and means for detachably affixing said impeller chamber directly to a bottom wall of a receptacle containing the liquid to be pumped, said receptacle wall providing a cover for said impeller chamber and having a drain port concentric with said impeller and of suitable size relative to said impeller to provide an inlet appropriate to the pump capacity.

3. In combination, a structure providing a side wall portion and an end wall portion of an impeller chamber for a liquid pump, a drive motor, motor shaft means extending into said impeller chamber, an impeller on said shaft means, said impeller having a hub projecting beyond the side wall portion of said impeller chamber, and means for detachably affixing said structure to a wall of a receptacle containing the liquid to be pumped, said receptacle wall providing a cover for the open end of said impeller chamber and having a drain port concentric with said impeller hub and receiving a portion thereof to provide therewith an annular pump inflow passage.

THOMAS T. WOODSON.

REFERENCES CITED

The following references are of record in the file of this patent:

UNITED STATES PATENTS

| Number | Name | Date |
|---|---|---|
| 1,879,221 | Harrigan | Sept. 27, 1932 |
| 2,292,993 | Curtis | Aug. 11, 1942 |
| 2,492,228 | Hollerith | Dec. 27, 1949 |
| 2,499,158 | Perry | Feb. 28, 1950 |